2,891,887

DIALKYL 1,3-DI(CARBALKOXY)-1-PROPEN-2-YL PHOSPHATE PESTICIDES

Everett E. Gilbert, Morris Township, Morris County, N.J., assignor to Allied Chemical Corporation, a corporation of New York No Drawing. Application October 25, 1957
Serial No. 692,243

18 Claims. (Cl. 167—22)

This invention relates to the production of novel vinyl ester phosphates useful as active pesticidal toxicants.

These novel ester phosphates, dialkyl 1,3-di(carboalkoxy)-1-propen-2-yl phosphates, conform to the general formula:

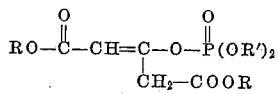

in which R and R' are alkyl radicals, particularly alkyl radicals containing from one to four carbon atoms.

Preferred examples of R and R' in the vinyl ester phosphates of the present invention are methyl and ethyl.

Vinyl ester phosphates of the general formula given above may be prepared by any of the methods known in the art for producing related compounds.

According to one method, a dialkyl acetone dicarboxylate is reacted with sodium metal dissolved in alcohol to form an intermediate sodium compound which is then reacted with a dialkyl chlorophosphonate to produce the vinyl ester phosphate. These reactions are represented by the following equations:

(1)
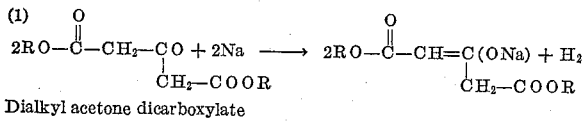
Dialkyl acetone dicarboxylate (2)
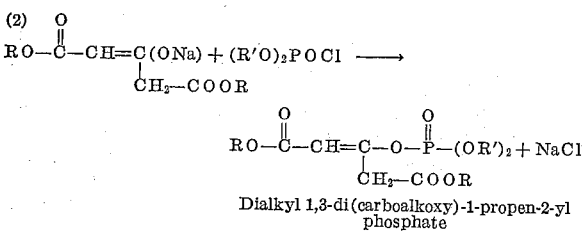
Dialkyl 1,3-di(carboalkoxy)-1-propen-2-yl phosphate According to another method, a dialkyl acetone dicarboxylate is reacted with sulfuryl chloride to produce an intermediate chlorinated compound which is then reacted with a trialkyl phosphite to produce the vinyl ester phosphate. The equations representing these reactions are as follows:

(1)
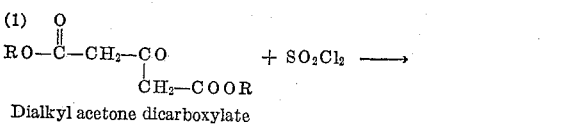
Dialkyl acetone dicarboxylate (2)
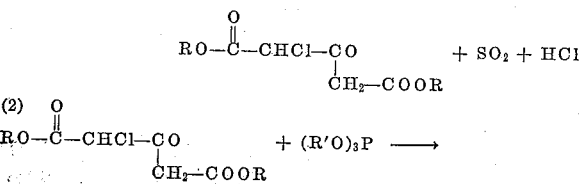

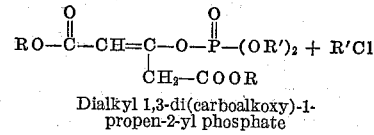
Dialkyl 1,3-di(carboalkoxy)-1-propen-2-yl phosphate

The last-described method was employed in the following examples illustrating the production of typical vinyl ester phosphates of the present invention. In the examples, parts are by weight.

*Example 1.*—206 parts of dimethyl acetone dicarboxylate were placed in a reaction vessel. 135 parts of sulfuryl chloride were added dropwise to the reaction vessel with stirring over a 15-minute period at a temperature of 30° to 40° C. After addition of the sulfuryl chloride the reaction mixture was heated for about 15 minutes at about 80° C. to complete the reaction. The chlorinated product was cooled to 20° C., and 166 parts of triethyl phosphite were added dropwise with stirring and external cooling to maintain the reaction temperature at 35° to 40° C. The reaction mixture was then heated to 55° C. and finally on a steam bath in a gentle blast of air for 2 hours to remove the ethyl chloride formed during the reaction. A yield of 346 parts of a yellow oil was obtained. Upon distillation of the yellow oil, the following vinyl ester phosphate was recovered as the fraction boiling between 160° and 167° C. at 2 mm. Hg.

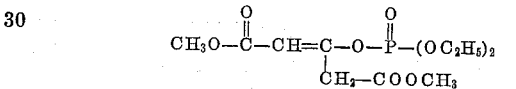
Diethyl 1,3-di(carbomethoxy)-1-propen-2-yl phosphate

*Example 2.*—206 parts of dimethyl acetone dicarboxylate were placed in a reaction vessel. 135 parts of sulfuryl chloride were added dropwise to the reaction vessel with stirring over a 15-minute period at a temperature of 30° to 40° C. After addition of the sulfuryl chloride, the reaction mixture was heated for about 15 minutes at about 80° C. to complete the reaction. The chlorinated product was cooled to 20° C., and 124 parts of trimethyl phosphite were added dropwise with stirring and external cooling to maintain the reaction temperature at 35° to 40° C. The reaction mixture was then heated to 55° C. and finally on a steam bath in a gentle blast of air for 2 hours to remove the methyl chloride formed during the reaction. A yield of 318 parts of a yellow oil was obtained. Upon distillation of the yellow oil, the following vinyl ester phosphate was recovered as the fraction boiling between 155° and 164° C. at 1.7 mm. Hg.

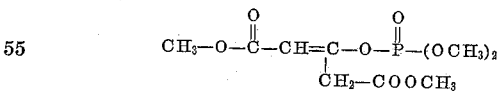
Dimethyl 1,3-di(carbomethoxy)-1-propen-2-yl phosphate

*Example 3.*—80.4 parts of diethyl acetone dicarboxylate were placed in a reaction vessel and cooled in ice water. 54.0 parts of sulfuryl chloride were added dropwise with stirring to the reaction vessel over a 15-minute period. The reaction mixture was then heated on a steam bath with intermittent agitation until the reaction was completed. The resultant reaction product, comprising 94.6 parts, was divided in equal portions:

(a) To one equal portion, 33.2 parts of triethyl phosphite were added dropwise with stirring and external cooling to maintain the reaction temperature at 40° to 45° C. The reaction mixture was then heated for about 2 hours on the steam bath to remove the ethyl chloride formed during the reaction. A yield of 67.6 parts of a yellow oil, comprising the following vinyl ester phosphate, was obtained:

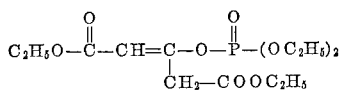

Diethyl 1,3-di(carboethoxy)-1-propen-2-yl phosphate (b) To the other equal portion, 24.8 parts of trimethyl phosphite were added dropwise with stirring and external cooling to maintain the reaction temperature at 35° to 40° C. The reaction mixture was then heated on a steam bath for two hours to remove the methyl chloride formed during the reaction. A yield of 62.0 parts of a yellow oil, comprising the following vinyl ester phosphate, was obtained:

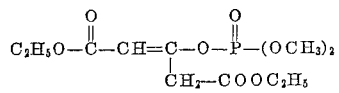

Dimethyl 1,3-di(carboethoxy)-1-propen-2-yl phosphate or emulsions may be formed by incorporating in water dry mixtures or so-called wettable spray powders containing the phosphate products of the invention. These mixtures may also include inert diluents, suitable quantities of wetting or emulsifying agents and, if desired, secondary toxicants.

The aqueous spray dispersions of the invention preferably should contain the active ingredient in an amount not less than 1/64 of a pound per 100 gallons of spray, the more usual concentrations being in the range of 1/16 to 1/4 of a pound per 100 gallons of spray.

The table below contains the results of tests relating to the use of a number of typical vinyl ester phosphates of the invention as insecticides and miticides. In the table, diethyl 1,3-di-(carbomethoxy)-1-propen-2-yl phosphate is given the code number 3661, dimethyl 1,3-di(carbomethoxy)-1-propen-2-yl phosphate is given the code number 3707, diethyl 1,3-di(carboethoxy)-1-propen-2-yl phosphate is given the code number 3855 and dimethyl 1,3-di(carboethoxy)-1-propen-2-yl phosphate is given the code number 3856.

| Vinyl Ester Phosphate | Formulation (Parts by Volume) | Percent Kill | | | | | |
|---|---|---|---|---|---|---|---|
| | | Mexican Bean Beetle Larvae | Mites | Pea Aphids | Southern Army Worms | House-flies | Birch Miners Leaf |
| 3661 | 1 part vinyl ester phosphate composition [1] per 39 parts acetone plus 40 parts water. | 100 | 100 | 100 | 100 | | |
| 3707 | ----do [1] | 100 | 100 | 100 | 100 | | |
| 3661 | 1 part vinyl ester phosphate composition [1] per 39 parts sugar solution (20 lbs. sugar dissolved in water to 100 gallons). | | | | | 100 | |
| 3707 | ----do [1] | | | | | 100 | 88.5 |
| 3661 | 1 part vinyl ester phosphate composition [1] per 319 parts water. | | | | | | 100 |
| 3707 | ----do [1] | | | | 84.2 | | |
| 3661 | 1 part vinyl ester phosphate composition [1] per 2559 parts water. | | | | 90 | | |
| 3707 | ----do [1] | | | | | | |
| 3855 | ----do [1] | 100 | | | | | |
| 3856 | ----do [1] | 100 | | | | | |
| 3855 | 1 part vinyl ester phosphate composition [1] per 5119 parts water. | | | 100 | | | |
| 3856 | ----do [1] | | | 99 | | | |

[1] An acetone solution comprising 4.8 grams of vinyl ester phosphate per 100 cc. of solution.

These compounds are ordinarily applied as toxicants for combatting insects and mites, in conjunction with a carrier which may be a solid, liquid or gaseous material, the invention compounds constituting the essential active toxic ingredients of such compositions. For this purpose, the vinyl ester phosphates hereof may be employed either in the form of aqueous sprays or dust compositions, and the amount of toxicant used may vary, a sufficient quantity being utilized to provide the desired toxicity.

When employed in the form of a powder or dust for killing insects and mites, the above compounds or toxicants may be mixed with a substantial proportion of any suitable inert material or diluent, preferably in finely divided form, such as known grades of prepared parasiticide carrier clays, pyrophyllite, fuller's earth, bentonite, sulfur, lime, talc, whiting, diatomaceous earth, etc. Suitable dusts of this type usually contain not less than 0.25% and preferably not less than 1% by weight of toxicant.

Liquid insecticide or miticide sprays containing the toxicants of the invention may be prepared by first forming a solution of the compound in a suitable organic solvent, e.g., xylene, methylated naphthalenes or any highly aromatic petroleum-type insecticide oil, and preferably adding a small amount of wetting or emulsifying agent commonly employed in the art, such as diglycol oleate or p-isooctyl phenyl ether of polyethylene glycol. The resulting concentrate solution is incorporated with water in quantity sufficient to form an aqueous spray dispersion or emulsion having the desired active ingredient concentration.

In a preferred embodiment, aqueous spray dispersions

The tests on toxicity to Mexican bean beetle larvae (*Epilachna varivestis*) were run by spraying horticultural (cranberry) bean plants with the indicated formulation and allowing the plants to dry. The larvae were confined to the treated foliage by means of wire cages. Record of the kill was made 3 days after treatment.

The mite tests were run on "red spider" (*Tetranychus bimaculatus*) by spraying the indicated formulation onto horticultural (cranberry) bean plants infested with the mites. Following treatment, the plants were stored on racks in irrigated trays under greenhouse conditions. Mortality counts were made 3 days after treatment.

The tests on toxicity to pea aphids (*Macrosephum pisi*) were run by removing the pea aphids from infested plants, placing them on a wire screen and spraying them with the indicated formulation. Following treatment, the pea aphids were confined to untreated broad bean plants. Record of kill was made three days after treatment.

The tests on southern armyworms (*Prodenia eridania*) were run by spraying horticultural (cranberry) bean plants with the indicated formulation and allowing the plants to dry. The armyworms were confined to the treated foliage by means of wire cages. Mortality count was made 3 days after treatment.

The tests on house flies (*Musca domestica*) were run by spraying the indicated formulation onto glass plates and allowing them to dry. The flies were confined over the plates, and percent kill was recorded 24 hours after confinement.

The toxicity tests on birch leaf miners (*F. pusilla*) were run by spraying branches from infested birch trees with the indicated formulation. After treatment, the branches were placed in water in order to keep the foliage alive. Mortality record was made 3 days after treatment.

While I have described the preferred embodiments for carrying out my invention, it will be apparent that many changes may be made without departing from the spirit of the invention.

I claim:

1. A vinyl ester phosphate having the following general formula:

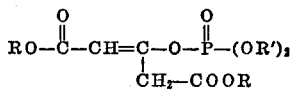

in which R and R' are alkyl radicals containing from 1 to 4 carbon atoms.

2. A vinyl ester phosphate having the following general formula:

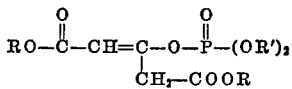

in which R and R' are alkyl radicals selected from the group consisting of methyl and ethyl.

3. The vinyl ester phosphate having the following formula:

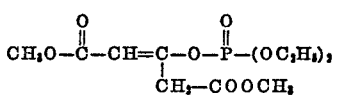

4. The vinyl ester phosphate having the following formula:

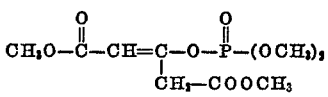

5. The vinyl ester phosphate having the folowing formula:

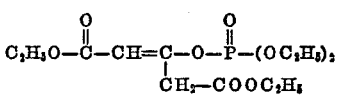

6. The vinyl ester phosphate having the following formula:

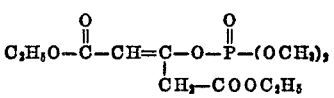

7. Insecticidal and miticidal compositions comprising a vinyl ester phosphate having the following general formula:

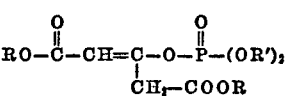

in which R and R' are alkyl radicals containing from 1 to 4 carbon atoms together with a carrier therefor.

8. Insecticidal and miticidal compositions comprising a vinyl ester phosphate having the following general formula:

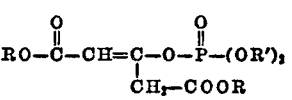

in which R and R' are alkyl radicals selected from the group consisting of methyl and ethyl, together with a carrier therefor.

9. Insecticidal and miticidal compositions comprising the vinyl ester phosphate having the folowing formula:

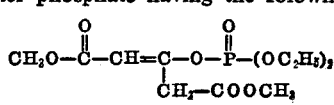

together with a carrier therefor.

10. Insecticidal and miticidal compositions comprising the vinyl ester phosphate having the following formula:

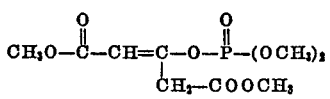

together with a carrier therefor.

11. Insecticidal and miticidal compositions comprising the vinyl ester phosphate having the following formula:

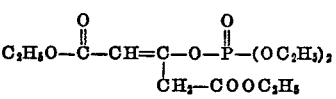

together with a carrier therefor.

12. Insecticidal and miticidal compositions comprising the vinyl ester phosphate having the following formula:

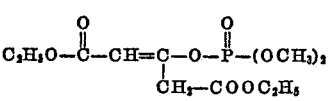

together with a carrier therefor.

13. The process of combatting pests including insects and mites which comprises applying to said pests a vinyl ester phosphate having the following general formula:

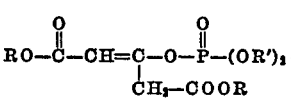

in which R and R' are alkyl radicals containing from 1 to 4 carbon atoms.

14. The process of combatting pests including insects and mites which comprises applying to said pests a vinyl ester phosphate having the following general formula:

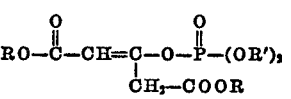

in which R and R' are alkyl radicals selected from the group consisting of methyl and ethyl.

15. The process of combatting pests including insects and mites which comprises applying to said pests the vinyl ester phosphate having the following formula:

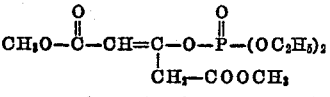

16. The process of combatting pests including insects and mites which comprises applying to said pests the vinyl ester phosphate having the following formula:

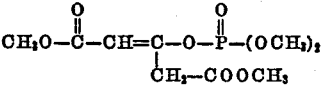

17. The process of combatting pests including insects and mites which comprises applying to said pests the vinyl ester phosphate having the following formula:

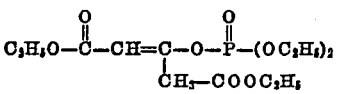

18. The process of combatting pests including insects and mites which comprises applying to said pests the vinyl ester phosphate having the following formula:

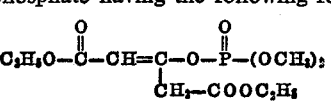

No references cited.